United States Patent [19]
Groff

[11] 3,820,617
[45] June 28, 1974

[54] GOLF CARTS
[76] Inventor: Stephen A. Groff, 1857 Sheridan N.E., Warren, Ohio 44483
[22] Filed: Sept. 28, 1973
[21] Appl. No.: 401,844

[52] U.S. Cl. ............... 180/19 R, 180/10, 180/65 F, 280/DIG. 5, 301/6 D
[51] Int. Cl. .......................................... B62d 51/04
[58] Field of Search ........ 180/19 R, 19 H, 19 S, 10, 180/65 F, 65 R, 60, 62; 280/DIG. 5; 301/6 D; 305/7; 192/41; 74/433

[56] References Cited
UNITED STATES PATENTS
| | | | |
|---|---|---|---|
| 866,410 | 9/1907 | Walker | 180/65 F |
| 3,167,146 | 1/1965 | Rudolph | 180/19 R |
| 3,753,473 | 8/1973 | Hollis | 180/19 H |

*Primary Examiner*—David Schonberg
*Assistant Examiner*—John A. Pekar
*Attorney, Agent, or Firm*—Michael Williams

[57] ABSTRACT

A powered, two-wheel golf cart having gearing disposed within a wheel and having direct drive connection with an electric motor. The result is an economical, efficient drive for a two-wheel golf cart, which is free of bulky attachments so that the improved cart does not materially differ in appearance as compared to a conventional, non-powered cart. Efficient clutch mechanism is provided to selectively drive the cart, and enables the golfer to select whether to drive or pull the cart.

10 Claims, 5 Drawing Figures

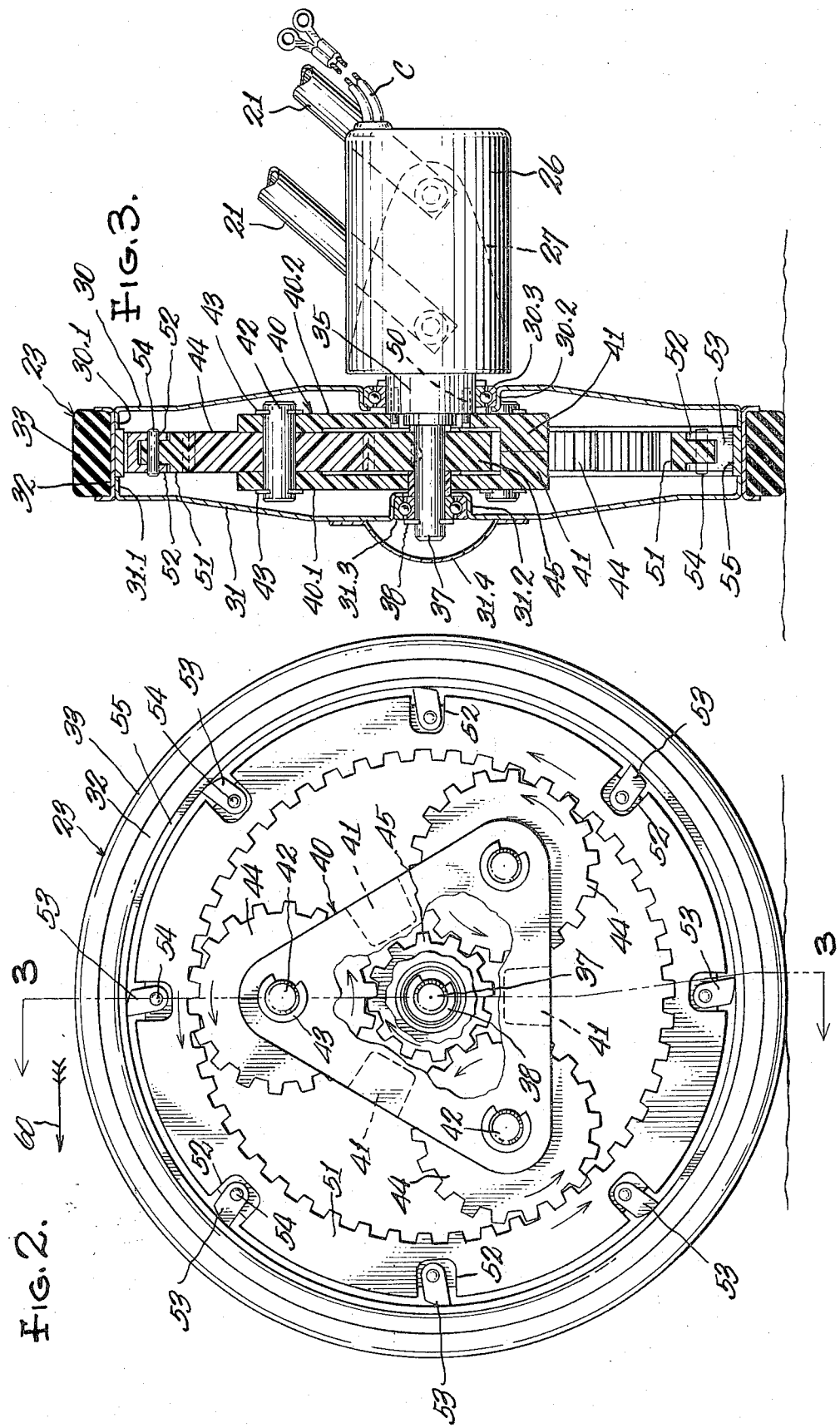

3,820,617

GOLF CARTS

BACKGROUND AND SUMMARY

More golfers at the present time are favoring some sort of powered conveyance for their golf bag and clubs. Powered riding carts are quite popular but they have serious disadvantages. First of all, such carts are quite expensive and therefore beyond the means of the average golfer. Further, such carts need a good-sized storage space and this may not always be readily available. Also, such carts are quite heavy and therefore their use is prohibited when the course is wet.

Two-wheel golf carts, of the pull type, are quite popular because of their low cost, easy storage, especially when they are collapsible, and their adaptability to all sorts of golf course conditions. However, such pull carts require a certain amount of energy to be expended to propell them and thus have not been suitable for elderly golfers, or golfers with heart or other ailments.

As a compromise to the riding cart and the pull cart, power-driven two-wheel carts have heretofore been proposed, but these carts have not met with any degree of commercial success because the additions made to the two-wheel cart to powerize it have been costly and unsightly.

The improved powered, two-wheel golf cart herein disclosed combines low-cost with attractive design to produce a powered cart which retains the sleek lines of the non-powered carts. The drive train, in the improved cart, is contained within the wheel of the cart, with the exception of a small DC drive motor and a high performance battery, and these are efficiently placed for maximum performance. In the preferred form, the drive motor provides support for the lower end of collapsing linkage and the battery is hidden beneath the golf support pad. Gearing is contained with a cart wheel, together with one-way clutch mechanism and thus are out of sight and protected from the elements. A speed regulator is carried by the golf cart post within easy access of the golfer's hand, to regulate the revolutions of the drive motor shaft and thus the speed at which the cart is propelled.

The golfer, in the improved cart, grasps the handle in the usual manner and may pull the cart in conventional manner if he does not want it power-driven, since the one-way clutch will permit this. Should the golfer tire, or for any reason wants the cart to be self-propelled, he merely depresses the speed regulator button a desired amount, and thereafter his hand is used merely to guide the cart.

DESCRIPTION OF THE DRAWINGS

In the drawings accompanying this description and forming a part of this application, there is shown, for purpose of illustration, an embodiment which the invention may assume, and in these drawings:

FIG. 2 is an enlarged, side view of the power-driven wheel, the outer wheel cover being omitted and parts being broken away to illustrate interior construction, FIG. 3 is a sectional view corresponding to the line 3—3 of FIG. 2.

DESCRIPTION OF THE PREFERRED EMBODIMENT

Figure 1A:
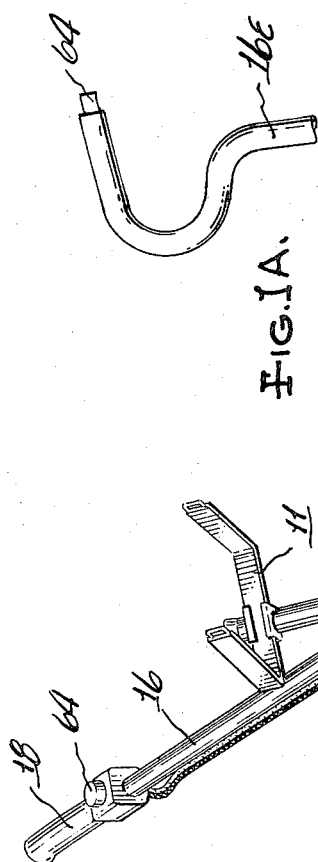
FIG. 1A is a fragmentary view of a modified handle construction.
Figure 1:
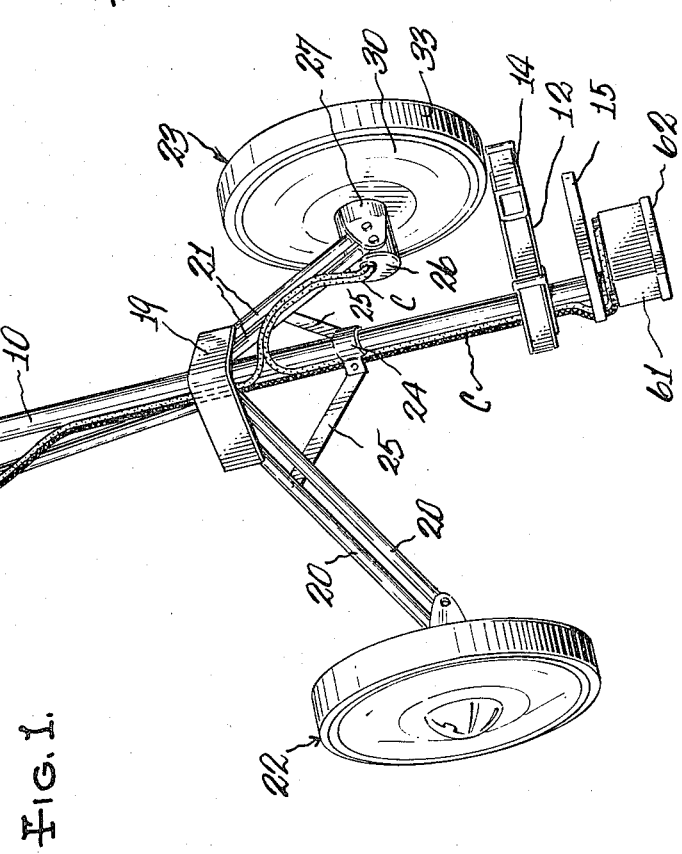
FIG. 1 is a perspective view of a collapsible, two-wheel pull cart, embodying the invention.

FIG. 1 discloses a standard two-wheel golf cart, modified in accordance with the present invention. The standard cart comprises an upright central frame member or post 10 that is usually formed of metal tubing. U-shaped brackets 11 and 12 are secured to upper and lower ends, respectively, of the post 10, to cradle a golf bag (not shown) in the usual manner. Suitable belts or straps (as the strap 14 on bracket 12) are provided to releasably secure the golf bag in position.

A support platform or shelf 15 is secured to the lower end of post 10, upon which the bottom of the golf bag rests. A handle 16, also usually made of metal tubing, has its lower end secured to the post 10, as by sleeve connection 17, and a hand-grip 18 usually of rubber of plastic, is secured to the upper free end of the handle tube 16. A metal bracket 19 is secured to the post 10 midway of the ends of the latter, and pairs of links 20—20 and 21—21, have their upper ends pivotally connected to respective sides of the bracket 19, and their lower ends pivotally connected to axle supports for respective wheels 22, 23. A locking sleeve 24 is slidable to selected positions along the post 10 and has links pivoted to it and respective links 20, 21, to selectively hold the golf cart in operating or collapsed positions. All of the foregoing is known in the prior art and is included herein as background for disclosure of the present invention.

As best seen in FIG. 3, a direct-current electric motor 26 has pads 27 (see also FIG. 1) to which the lower ends of links 21, 21 are pivoted. The motor 26 is adapted to drive the wheel 23, but it will be appreciated that either or both wheels may be power-driven. The motor 26 may be of any suitable type, and commercially available motors are compact in size, with low mass and high torque, and variable speed.

The wheel 23 is substantially similar to the wheel 22 in appearance, and also generally similar in general wheel construction to effect manufacturing economies. Thus, each wheel may have inner and outer wheel covers 30, 31 which may be formed of metal or plastic and provided with attractive exterior appearance. The outer periphery of each cover is formed with an inturned, circular flange 30, 1, 31.1, and these flanges fit within a tire rim 32. Preferably, the flange 30.1 is spot welded or otherwise securely fixed to the rim while the flange 31.1 has a friction or snap fit with the rim. The rim 32 is preferably U-shaped in cross-section to receive and retain a rubber tire 33. The inner periphery of each wheel cover 30, 31 is formed with inturned bearing seats 30.2, 31.2, respectively, to receive and support respective roller bearings 30.3, 31.3.

The bearing seat 30.3 is larger in diameter than the bearing seat 31.3, although these seats could be made the same diameter to effect interchangeability of the wheel covers 30, 31, since the covers are otherwise the same. A hub cap 31.4 is detachably connected to the outer wheel cover in any suitable manner. The motor 26 is provided with a hub 35, the periphery of which supports the inner race of the bearing 30.3. A series of projections 36, or an annular flange, on the hub 35, hold the inner race of bearing 30.3 against movement in the direction of the motor 26. The motor shaft 37 provides the axle support for the inner race of the bearing 31.3, and a snap ring 38 holds this race and the entire assembly in position.

A gearing mount or housing 40, of plastic, metal, or other suitable material, is disposed within the confines of the wheel 23 and preferably is of the triangular shape shown in FIG. 2. The housing is made in two complementary halves 40.1, 40.2, which have three facing and abutting lugs 41 to define a predetermined spacing between inner surfaces of the housing halves. Stub shafts 42 pass through the three corners of the gear housing 40 and are held in position by snap rings 43. A gear 44 is freely rotatable upon each stub shaft 42 and each gear meshes with a center or drive gear 45 which is keyed or otherwise suitably affixed to the motor shaft 37. The gear housing could be made as a one piece molding, in which case the lugs 41 would be integral with the sides 40.1, 40.2. In a one-piece construction, the lugs 41 would have to be spaced to permit clearance for assembly of the drive gear 45.

The gear housing is held against rotation by means of a plurality of pins 50 which extend from the motor hub 35 and fit within holes in the housing half 40.2. The gears 44 mesh with internal teeth on a ring gear 51, and both the gears and ring may be formed of plastic, metal, or other suitable material. The ring gear 41 is formed with a plurality of recesses 52 inward of its periphery (eight such recesses being shown in FIG. 2) and each recess forms a thinner wall in the ring, which wall is straddled by the legs 52 of respective clutch cams 53, and pins 54 pivotally connect the legs to the walls. The clutch cams 53 cooperate with the inner peripheral surface of a ring 55 which is securely fixed to the inner surface of the tire rim 32, as by welding or the like. Since the clutch cams and ring 55 provide the one-way clutch element of the invention, they are preferably formed of hardened steel.

In the disclosed embodiment, and with reference to the disposition of parts in FIG. 2, the motor 26 rotates the center gear 45 in clockwise manner and this gear causes counter-clockwise rotation of the gears 44 and the latter in turn cause counter-clockwise rotation of the ring gear 51. Such rotation of the ring gear causes the cutch cams 53 to bind against the inner surface of the ring 55 and therefore drive the wheel 23 to the left, as shown by arrow 60.

With no power applied by the motor 26, a golfer may pull the cart in the direction of the arrow 60, and the ring 55 will rotate freely with the rim 32 and tire 33, the clutch cams 53 merely sliding within the inner surface of the rim 55. This would also be true if the golfer pulled the cart faster than the drive of the motor.

The motor 26 is powered by a re-chargeable battery 61, and commercially available batteries are small in size and yet have ample storage capacity to propel the cart for several rounds of golf between charging. In FIG. 1, the battery 61 is shown as supported on a shelf 62 which is fixed to the lower end of the post 10, below the bag support 15. A suitable case (not shown) may be provided to protect the battery from moisture and dirt. A control switch 63 is secured to the handle 16, adjacent to the hand grip 18. A push button 64 is pushed by a spring 65 to an outermost position with respect to the switch casing.

Figure 4:
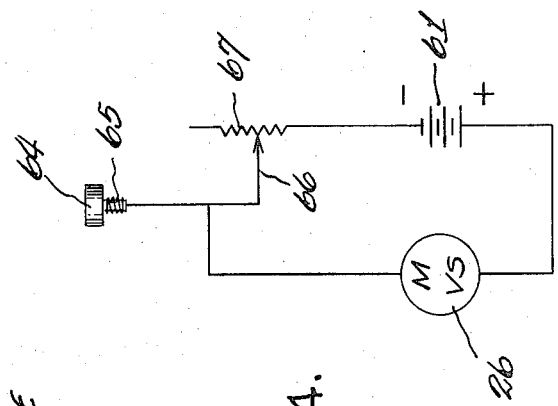
FIG. 4 is a simplified diagram of the electrical system involved in the invention.

As diagramatically shown in FIG. 4, the push button controls the position of a wiper 65 with respect to the resistance 67 of a linear rheostat. In fully outward position of the push button 64 the wiper 66 is in an uppermost position, clear of the resistance 67, and no current flows from the battery 61 to the motor 26, and therefore no power is applied to the wheel 23. In this condition, the golf cart may be pulled in normal manner. As the push button 64 is depressed (such as by the thumb of the hand on the grip 18) less resistance is interposed in the circuit and thus the motor shaft 37 is driven at greater speed. Suitable wiring cables, designated C in FIG. 1, may be held close to the center post 10, and therefore do not interfere with the collapsing of the golf cart. The push button 64 may be located in the end of curved handle end 16e, as seen in FIG. 1A, in position to be controlled by the thumb of a golfer's hand which comfortably fits with the curvature of the handle.

I claim:

1. A powered golf cart, comprising:
    a frame adapted to support a golf bag and having wheels for movement of the frame along the ground, at least one of said wheels having a tire rim,
    a drive for said one wheel, comprising an electric motor disposed so that the axis of its shaft is concentric with said wheel,
    a drive gear on said motor shaft and rotatable therewith,
    a gear housing held against rotation, and gear means carried by said housing for rotation therein, said gear means meshing with said drive gear,
    a ring gear meshing with said gear means and rotatable thereby, and
    clutch means between said ring gear and the tire rim of said wheel.

2. The construction according to claim 1 wherein said golf cart is of the two-wheel pull type, and said clutch means provides a one-way drive for said wheel.

3. The construction according to claim 2 wherein said golf cart is of the collapsible type, comprising a frame post, a pull handle on said post, two linkage means to provide for collapsing of said cart, each having one end pivotally connected to said post,
    one linkage means having its other end pivotally connected to the axle support for one wheel, and
    the other linkage means having its other end pivotally connected to the housing of said electric motor, the motor shaft providing the axle for the other wheel.

4. A powered two-wheel pull-type golf cart, comprising an upright post having means for supporting a golf bag,
    a pair of wheels connected to said post so that the latter and the golf bag may be moved over the ground, each wheel having a tire rim and a tire on said rim,
    an electric motor for driving one of said wheels and a battery for energizing said motor and carried by said post, said motor being supported on said post so that its drive shaft is concentric with the axis of said one wheel,
    a drive gear on said motor shaft and rotatable therewith,
    a gear mount connected to the housing of said motor and held against rotation,
    a gear rotatable on said mount in off-center relation with respect to said drive gear and meshing with the latter and rotated thereby, a ring gear meshing with said off-center gear and rotatable thereby, and clutch means between said ring gear and the tire rim of said one wheel.

5. The construction according to claim 4 and further including a first shelf connected to the lower end of said post for supporting the bottom of the golf bag, and a second shelf connected to the lower end of said post and spaced below said first shelf, said second shelf supporting said battery.

6. The construction according to claim 4 wherein said gear mount is triangular in shape and rotatably supports a gear at each of its corners in off-center relation with respect to said drive gear, each off-center gear meshing with said drive gear and with said ring gear.

7. The construction according to claim 4 and further comprising an inner and outer circular wheel cover for said one wheel, each cover having an outer periphery connected to said wheel rim, said inner wheel cover having a central bearing support, and an inner bearing between the latter and the motor housing, said outer wheel cover having a central bearing support and an outer bearing between the latter and said motor shaft.

8. The construction according to claim 7 wherein said drive gear, said gear mount, said off-center gear, said ring gear and said clutch means are disposed within an annular space defined by and between said inner and outer wheel covers and thus are hidden from view and protected against deleterious matter.

9. The construction according to claim 4 wherein said clutch means comprises a hardened steel rim fixed to the inner periphery of said tire rim, and a plurality of clutch cams pivotally mounted in spaced relation on said ring gear along an outer peripheral portion, each of said clutch cams engaging said steel rim in driving relation in one direction of rotation of said ring gear.

10. The construction according to claim 4 and further including a pull handle having one end connected to said post, and a hand grip on the free end of said handle, and a regulator switch mounted on said handle and having an operating push button adjacent to said hand grip, said push button being spring-pressed to an outer position with respect to the casing of said switch, and in such position current supply from said battery to said motor is interrupted, and said push button being progressively depressible inwardly of said switch casing and actuating a rheostat to progressively remove electrical resistance from the circuit including the battery, motor and switch, to progressively increase the speed of rotation of said motor shaft.

* * * * *